United States Patent Office 2,967,160
Patented Jan. 3, 1961

2,967,160
SILYL COMPOUNDS

John F. Brown, Jr., Schenectady, N.Y., assignor to General Electric Company, a corporation of New York No Drawing. Filed Mar. 27, 1956, Ser. No. 574,075

8 Claims. (Cl. 260—2)

This invention relates to sildihydronaphthalene compounds and to the preparation thereof. More particularly, this invention relates to the production of organosilicon polymers in which dihydronaphthylene nuclei are linked to two different silicon atoms which method comprises reacting the alkali metal adduct of naphthalene with a halo- or an alkoxy-organosilane. In contrast to organopolysiloxanes which contain only repeating

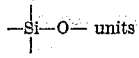

the polymers of this invention contain (1) repeating

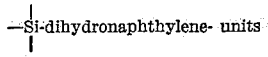

(i.e. sildihydronaphthylene units) and (2) repeating

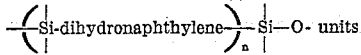

(i.e. both sildihydronaphthylene and siloxane units) wherein $n$ is a whole number of at least 1, and preferably 1 to 10 or higher. These polymers will be referred to generally as "polysildihydronaphthylenes." The terms "sil" and "silyl" are used interchangeably.

The dihydronaphthalenes of this invention are derivatives of 1,4- and 1,2-dihydronaphthalenes, i.e., the carbon atoms at the 1,4- or 1,2- positions are saturated. The silyl derivatives thereof are derived by replacing one or more of these hydrogens in the 1,4- or 1,2-positions with silyl groups.

This invention also relates to a process of preparing organosilicon compounds containing silicon-bonded hydrogens which comprises pyrolyzing sildihydronaphthalene compounds (i.e. a compound derived by replacing at least one hydrogen from the saturated carbon atoms of the dihydronaphthalene with a silyl group).

Heretofore polysilarylenes such as polysilphenylenes have been prepared by various methods. Thus, in U.S. Patent 2,383,817—Rochow, there is disclosed the preparation of polysilarylenes by the Grignard type reaction. As is well known, the Grignard synthesis is difficult to carry out on a commercial scale because of the precautions that must be observed in carrying out the reaction. In addition, polysilarylenes have been prepared by the sodium coupling of aromatic halides and chlorosilanes. In contrast to the products of this invention which are sildihydronaphthalene compounds, the products heretofore prepared were silarylene compounds.

I have now discovered a relatively simple method of preparing polysildihydronaphthylenes wherein each silyl group is attached directly through a silicon atom to a saturated carbon atom of the dihydronaphthylene group which comprises reacting a metal adduct of naphthalene, for example, the sodium-naphthalene addition product (also called "sodium-naphthalene") with an organohalosilane or an organoalkoxysilane with the formation of the corresponding sodium halide or sodium alkoxide as a by-product. Unexpectedly, it has been found that these compounds when pyrolyzed, yield organosilanes containing silicon-bonded hydrogens. Although the reactions will be described using organohalosilanes, the corresponding organoalkoxysilanes can also be employed.

In general, the reaction is carried out by preparing the metal adduct of naphthalene by reacting naphthalene with a metal capable of forming a naphthalene adduct in a suitable solvent, for example those solvents described in J. Amer. Chem. Soc. 58, 2442 (1936), J. Amer. Chem. Soc. 76, 3367 (1954), etc. The solvents disclosed in these publications can be described as solvents selected from the group consisting of tetrahydrofurane, trimethylamine, aliphatic monoethers containing a $CH_3O-$ group and polyethers derived from aliphatic polyhydric alcohols having all of the hydroxyl hydrogen atoms replaced by alkyl groups. Examples of such metals comprise the alkali metals, e.g. sodium, potassium, etc. These adducts are thereupon reacted with organosiliconhalides, e.g. dimethyldichlorosilane, diphenyldichlorosilane, methyltrichlorosilane, etc. to form polysildihydronaphthylenes wherein each silyl group is attached directly through a silicon atom to a saturated carbon atom of the dihydronaphthylene group. These compounds may be used per se as resinous coatings, etc. or may be pyrolyzed to organosilanes containing silicon bonded hydrogens. For example, when sodium-naphthalene was reacted with dimethyldichlorosilane, a dimethylsildihydronaphthylene polymer was formed, which could be pyrolyzed to give naphthyldimethylsilane. When sodium naphthalene was reacted with methyltrichlorosilane a compound was formed which yields methyldichlorosilane on pyrolysis.

Because of its highly reactive nature, sodium-naphthalene reacts very readily when contacted with organosilanes. Thus, compounds within the scope of formula $$R_nSiX_{4-n}$$

wherein X is a halogen radical, e.g. chlorine, bromine, etc.; or alkoxy, e.g. methoxy, ethoxy, propoxy, butoxy, etc.; $n$ has a value of from 1–3, and R is a member selected from the group consisting of alkyl radicals, e.g. methyl, ethyl, propyl, butyl, octyl, decyl, etc.; cycloalkyl radicals, e.g. cyclohexyl, cycloheptyl, etc.; aryl radicals, e.g. phenyl, diphenyl, naphthyl, tolyl, xylyl, etc.; aralkyl radicals, e.g. benzyl, phenylethyl, etc.; haloaryl radicals, e.g. chlorophenyl, dibromophenyl, etc.; and mixtures of the aforesaid radicals. Where $n$ is equal to 3, i.e. a compound having a functionality of 1, a non-polymeric compound is produced. However, where $n$ has a value of between above 1 and 2, polymeric materials can be formed. These polymeric materials comprise repeating units of the formula

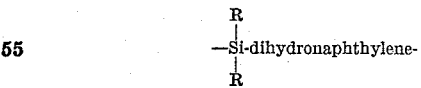

wherein R has the same meaning as described above and wherein the Si is bonded directly to a saturated carbon atom of the dihydronaphthylene group. In addition to organosilanes, halosilanes containing no organo groups, e.g. $SiCl_4$, etc. will also react with sodium-naphthalene. The addition of water to the reaction product also produces siloxane linkages.

The preparation of the metal addition product, such as, for example, sodium-naphthalene, is well known and has been described in JACS 58, 2442 (1936); JACS, 76, 3367 (1954), etc. As a result of this reaction, the sodium adduct is produced. Since this is an addition rather than a substitution reaction, the products formed therefrom upon reaction with halosilanes are dihydronaphthalene derivatives wherein each silyl group is attached directly through a silicon atom to a saturated carbon atom of the dihydronaphthylene group and not naphthalene derivatives wherein each silyl group is attached directly through a silicon atom to an unsaturated carbon atom.

The ratio of sodium-naphthalene to the chlorosilane is not critical. However, it is desirable to have at least one mole equivalent of chlorine for each mole equivalent of sodium in the sodium-naphthalene. Excess of the chlorosilanes can advantageously be employed since they can be easily removed from the reaction mixture because they boil at relatively low temperatures.

Since chlorosilanes react very readily with sodium-naphthalene, the temperature of the reaction is not critical. Thus, the reaction can take place below room temperature, at room temperature, or at elevated temperatures.

Sildihydronaphthalene compounds having each silyl group attached directly through a silicon atom to a saturated carbon atom of the dihydronaphthalene are pyrolyzed by heating above that temperature at which decomposition takes place. As is quite evident, this temperature will vary depending on the particular compound which is pyrolyzed. However, I have advantageously employed pyrolytic temperatures ranging from about 200–400° C. Besides producing compounds containing silicon-bonded hydrogens, other compounds are also produced.

In order that those skilled in the art may better understand the nature of my invention the following examples are given by way of illustration and not by way of limitation.

EXAMPLE 1

*Preparation of poly(dimethylsildihydronaphthylene)*

Into a 1 liter three-neck flask equipped with a stirrer, nitrogen inlet and outlet tubes, and thermometer was placed 400 ml. of dry 1,2-dimethoxyethane, 10 g. of sodium metal chips, and 40 g. of naphthalene. The reaction started immediately forming the greenish-black sodium-naphthalene adduct. After 2.7 hours' stirring at room temperature there remained 2 g. of unreacted sodium, which was fused together in a single lump. The slurry of the sodium compound was added to 38 ml. of dimethyldichlorosilane in 10 ml. more 1,2-dimethoxyethane. There was an instantaneous reaction to give a pale yellow solution from which the suspended colloidal sodium chloride separated only very slowly. This solution was distilled to remove the excess dimethyldichlorosilane and about ⅔ of the solvent, and then added to water to hydrolyze the residual chloride of the poly(dimethylsildihydronaphthylene) and the bis(dimethylchlorosil) dihydronaphthalene, and also to dissolve the excess solvent, sodium chloride, and hydrochloric acid. The precipitated polymer-naphthalene mixture was filtered off and purified by twice dissolving it in ether and reprecipitating the polymer by addition to alcohol. There was thus obtained 15.5 g. of crude yellowish polymer. After heating in a vacuum to remove traces of solvents and naphthalene, the polymer was a rosin-like substance, M.P. ca. 75° C., whose infrared spectrum indicated the presence of aryl, dimethylsil, and a small amount of siloxane groupings. The analysis indicated that it contained dimethylsildihydronaphthyl and dimethylsildihydronaphthyldimethylsiloxy groups in a 7:1 ratio.

*Analysis.*—Calcd. for $(C_{10}H_8)_7(C_2H_6Si)_8O$: C, 75.0; H, 7.6; Si, 16.3. Found: C, 75.3; H, 8.0; Si, 16.7.

EXAMPLE 2

*Pyrolysis of poly(dimethylsildihydronaphthylene)*

Five grams of the polymer prepared in Example 1 was heated to 300–400° C. A light yellow oil, 2.5 g., slowly distilled over, and a viscous liquid which solidified on cooling to a brittle resin was left behind. The oil was fractionated and found to be about 50% naphthyldimethylsilane, a colorless liquid, b. 113°/4.7 mm., $n_D^{20}$ 1.5895, which showed the characteristic infrared bands of dimethylsil, SiH, and α-naphthyl groups.

*Analysis.*—Calcd. for $C_{12}H_{14}Si$: C, 77.4; H, 7.6. Found: C, 76.2, 77.4; H, 7.6, 8.0.

The higher boiling portions of the distillate contained a liquid B.P. ca. 115°/0.8 mm., $n_D^{20}$ 1.5438, whose infrared spectrum and analysis indicated a mixture of 1-α-naphthyl-3-hydro-tetramethyldisiloxane,

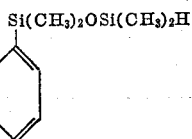

and 1-α-naphthyl-5-hydro-hexamethyltrisiloxane,

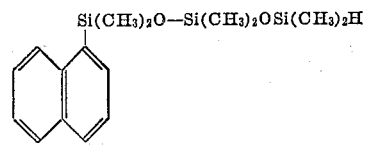

*Analysis.*—Calcd. for $C_{14}H_{20}Si_2O$: C, 64.5; H, 7.7. Calcd. for $C_{16}H_{26}Si_3O_2$: C, 57.4; H, 7.8. Found: C, 62.5; H, 7.9.

A modification of this reaction is effected by mixing dihydronaphthalene (prepared by having alcohol present during the reaction of sodium with naphthalene) with the sodium adduct so that one can control the amount of sodium per molecule of naphthalene. Thus, when one mole of dihydronaphthalene is mixed with one mole of the sodium adduct (which reacts as if it had 2 moles of sodium per mole of naphthalene), an equilibration is effected forming a sodium derivative of dihydronaphthalane that now reacts as if it had one mole of sodium per mole of dihydronaphthalene. When this composition is reacted with a compound, such as methyltrichlorosilane, it is believed that dihydronaphthylmethyldichlorosilane, $C_{10}H_9Si(CH_3)Cl_2$, is formed which yields methyldichlorosilane on pyrolysis. This modification is demonstrated in the following example.

EXAMPLE 3

*Conversion of methyltrichlorosilane to methyldichlorosilane*

Crude dihydronaphthalene was prepared by stirring together 10 g. of naphthalene, 5 g. of sodium metal, 15 ml. alcohol, and 100 ml. 1,2-dimethoxyethane. Because alcohol was present, it reacted with the sodium-naphthalene to yield dihydronaphthalene instead of the sodium adduct.

A mixture of 2.5 g. sodium metal chips, 5.0 g. naphthalene, 6.0 g. crude dihydronaphthalene (separated from the mixture prepared by the method described above) and 100 ml. 1,2-dimethoxyethane was stirred together at room temperature for 2.5 hours; there remained 1.2 g. unreacted sodium. The resulting suspension of the reddish-brown sodium derivative of dihydronaphthalene was added with good stirring to a solution of 15 ml. of methyltrichlorosilane in 50 ml. 1,2-dimethoxyethane. Upon adding a few milligrams of aluminum chloride the suspended colloidal sodium chloride coagulated and was then centrifuged off yielding 3.1 g. of sodium chloride. The solvent and excess methyltrichlorosilane were then distilled off. Next, the residue was slowly distilled at atmospheric pressure to give a distillate B.P. 210–212° C. containing naphthalene and dihydronaphthalene, and 0.8 g. of a very volatile liquid. This liquid mostly distilled at 39–43° C., and was identified from its infrared spectrum as methyldichlorosilane.

While the invention has been described in the above examples with particular reference to methylchlorosilanes, it is to be understood that it is broadly applicable to other organochlorosilanes, such as those herein described.

The polymers of this invention can be used per se as resins, etc. or can be suitably incorporated into other materials. For example, they can be compounded with substances, such as natural and synthetic rubbers, tars, asphalts, pitches, natural resins, such as wood resin, copal, shellac, etc., synthetic resins, such as phenol-aldehyde resins, urea-aldehyde resins, alkyd resin, etc.

The residues from the pyrolysis can be dissolved or dispersed in oils, such as linseed oil, China-wood oil, etc. alone, or mixed with solvents, pigments, plasticizers, driers, etc. to yield products which, when applied to a base member and air dried or baked yield resinous coatings.

The compounds containing silicon-bonded hydrogens are useful per se as oils, plasticizers, etc. or may be converted to hydrogen containing organopolysiloxanes. For example, methyldichlorosilane can be converted to hydrogen containing cyclic compounds (MeHSiO)$_n$ as described in U.S. Patent 2,595,891, which cyclic compounds can be used to prepare oils in the manner described in U.S. Patent 2,491,843. Methyldichlorosilane can be used in preparing hydrogen containing organopolysiloxanes useful in rendering textiles, etc. water repellent as described in U.S. Patent 2,386,259.

Because silicon-bonded hydrogens are comparatively reactive, they may be used in a wide variety of chemical reactions, such as, for example, the addition to vinyl groups, etc. or they may be incorporated into organopolysiloxanes.

What I claim as new and desire to secure by Letters Patent of the United States is:

1. A (disubstituted sil)-dihydronaphthalene compound wherein (1) the two substituents on the silicon atom of the disubstituted sil radical are selected from the group consisting of alkyl, cycloalkyl, aryl, aralkyl, and haloaryl radicals, (2) each disubstituted sil radical is attached directly through the silicon atom to a saturated carbon atom of the dihydronaphthylene radical and the remaining valence of the silicon atom is attached to a member selected from the group consisting of halogen, and the dihydronaphthylene radical with the proviso that (a) when the selected member is halogen there are two such halogen substituted sil radicals each attached to a separate saturated carbon atom of the aforesaid dihydronaphthylene radical, and (b) when the selected member is a dihydronaphthylene radical the said dihydronaphthalene compound is a sildihydronaphthylene polymer whose structural unit consists of one said dihydronaphthylene radical and one said disubstituted sil radical which are joined together by the free valence of the said disubstituted sil radical of one structural unit being connected to the saturated carbon atom of the dihydronaphthylene radical of the adjoining unit, and (3) all of the aforesaid dihydronaphthylene radicals are selected from the group consisting of 1,2-dihydronaphthylene and 1,4-dihydronaphthylene radicals.

2. A sildihydronaphthylene polymer whose structural units are

units wherein X is a dihydronaphthylene radical selected from the group consisting of 1,2-dihydronaphthylene and 1,4-dihydronaphthylene radicals, R is a monovalent radical selected from the group consisting of alkyl, cycloalkyl, aryl, aralkyl, and haloaryl radicals, and each Si atom is attached directly to a saturated carbon atom of the dihydronaphthylene radical.

3. The polymer of claim 2 wherein R is alkyl.

4. Bis(dialkylhalosil)dihydronaphthalene wherein each dialkylhalosil group is attached directly through the silicon atom to a saturated carbon atom of the dihydronaphthylene radical and the dihydronaphthylene radical is selected from the group consisting of 1,2-dihydronaphthylene and 1,4-dihydronaphthylene radicals.

5. Bis(dimethylchlorosil)dihydronaphthalene wherein each dimethylchlorosil group is attached directly through the silicon atom to a saturated carbon atom of the dihydronaphthylene radical and the dihydronaphthylene radical is selected from the group consisting of 1,2-dihydronaphthylene and 1,4-dihydronaphthylene radicals.

6. The process of preparing a sildihydronaphthalene compound which comprises reacting an adduct of naphthalene and an alkali metal selected from the group consisting of sodium and potassium with a compound having the formula $R_nSiX_{4-n}$ where $n$ is an integer from 1 to 3, X is a radical selected from the group consisting of halogen and alkoxy radicals and R is a radical selected from the group consisting of alkyl, cycloalkyl, aryl, aralkyl and haloaryl radicals, and mixtures of the aforesaid radicals, said adduct being dissolved in a solvent selected from the group consisting of tetrahydrofurane, trimethylamine, aliphatic monoethers containing a CH$_3$O— group and polyethers derived from aliphatic polyhydric alcohols having all of the hydroxyl hydrogen atoms replaced by alkyl groups.

7. The process of claim 6 wherein $n$ is 2.

8. The process of claim 6 wherein the alkali metal is sodium.

References Cited in the file of this patent

UNITED STATES PATENTS

| | | |
|---|---|---|
| 2,258,218 | Rochow | Oct. 7, 1941 |
| 2,352,974 | Rochow | July 4, 1944 |
| 2,556,462 | Barry et al. | June 12, 1951 |
| 2,624,721 | Hatcher et al. | Jan. 6, 1953 |
| 2,742,368 | Rossiter et al. | Apr. 17, 1956 |

OTHER REFERENCES

Scott et al.: J. American Chem. Soc., vol. 58, p. 2442 (1936).

Gilman et al.: J.A.C.S., vol. 73, pp. 4640–4644 (1951).

Chugunov et al.: Chem. Abst., vol. 48, 12716b (1954).